No. 782,552. PATENTED FEB. 14, 1905.
J. H. GLAUBER.
COUPLING PIPE.
APPLICATION FILED MAY 21, 1904.
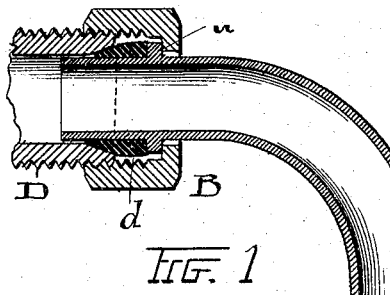
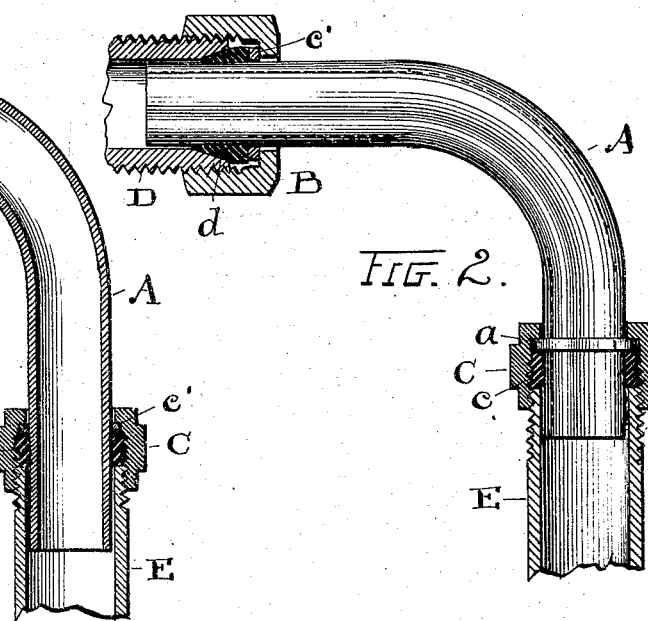
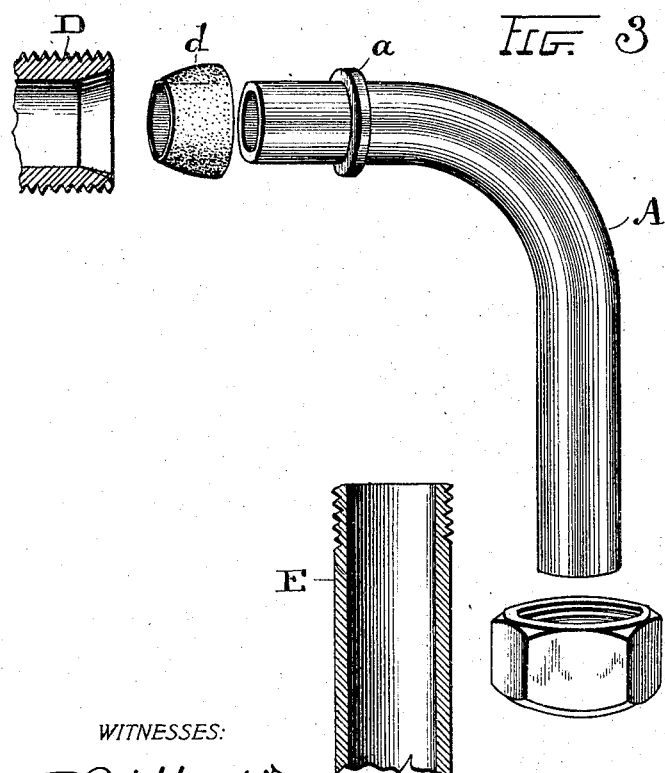
WITNESSES:
INVENTOR.
Joseph H. Glauber
BY H. J. Fisher
ATTORNEY.

No. 782,552.  
Patented February 14, 1905.

UNITED STATES PATENT OFFICE.

JOSEPH H. GLAUBER, OF CLEVELAND, OHIO.

COUPLING-PIPE.

SPECIFICATION forming part of Letters Patent No. 782,552, dated February 14, 1905.

Application filed May 21, 1904. Serial No. 209,014.

*To all whom it may concern:*

Be it known that I, JOSEPH H. GLAUBER, a citizen of the United States, residing at Cleveland, in the county of Cuyahoga and State of Ohio, have invented certain new and useful Improvements in Coupling-Pipes; and I do declare that the following is a full, clear, and exact description of the invention, which will enable others skilled in the art to which it appertains to make and use the same.

My invention relates to improvements in coupling-pipes; and the invention consists in the construction of the coupling-pipe and in the parts combined therewith, all substantially as shown and described, and particularly pointed out in the claims.

In the accompanying drawings, Figure 1 is a sectional elevation of one form of my improved coupling-pipe or pipe-coupling, showing the same coupled or connected up at both ends; and Fig. 2 is a sectional elevation of the said pipe connected up, as in Fig. 1, but in a reversed position. Fig. 3 is a view of a group view of details, showing each of the several parts which enter into Figs. 1 and 2 separate and apart from all the others, but in associated relations, and with the coupling elbow or pipe with its collar end above, as shown in Fig. 1.

As thus shown, A represents my new and improved coupling-pipe, which is usually of the elbow pattern and is provided with an integral or other permanently-fixed collar $a$ about one of its ends and at such distance from the immediate extremity or end of the pipe as will enable effective coupling to be made with another pipe or member which may be fixed. A good working distance of said collar from the end is about as seen in the several figures, and especially in Fig. 3, which enables the end beyond the collar to enter the fixed member D or E and through gasket $d$ and nut B or C make a fluid-tight connection therewith. The said collar or projection is in any case a fixed portion whatever its shape or form, and it may be developed from within the pipe itself more or less as a flange or be a separate part brazed or otherwise permanently secured upon the pipe, the idea being to have a fixed lateral projection on the exterior of the pipe adapted to be engaged directly or indirectly by one or the other of the coupling-nuts B and C, according as one end or the other is brought to the top or the bottom of the connection, as in Figs. 1 and 2. Thus in Fig. 1 the shorter arm of the elbow is above, and so in this instance the collar $a$ is engaged by nut B; but in Fig. 2 the shorter arm is below or down, and the nut C engages said collar. It will also be observed that the relationships of the end connections or members D and E top and bottom are different in said two views, and as such relationships are always liable to vary more or less, both as to the vertical and the horizontal positions of the said parts D and E, the connection E being relatively higher or lower, as the case may be, nearer to or farther from the perpendicular plane of the coupling D, as in Figs. 2 and 3, and hence a reversible elbow adapted to meet either position or relation of the parts, and others still which are not shown and which will work equally well with variations of these conditions is found to be very desirable. Then this invention possesses the further advantage of a coupling-pipe which requires no threading or other surface adaptation to make connections, but instead is perfectly smooth at both ends and is adapted at both to project more or less into both the connecting members as well as to be reversed in respect thereto, as shown. In making such connections the collar $a$ is the limit of projection into either pipe and as to that particular end; but the other end has no limit, and the rubber gaskets $c$ and $d$ serve to pack both connections fluid-tight. A loose washer $c'$, may be used with nut B or C at the end where there is no fixed collar. The nuts B and C are usually found with the coupling members D and E, to which they belong and to which my coupling-pipe is brought with its accompanying parts, and by reason of having a smooth pipe without any enlargement at the end which has no collar I am enabled to make the collar $a$ a permanent portion upon the pipe in the factory and send the elbow or joint out to the trade in a form which enables the plumber to sleeve the two nuts B and C over the joint at the uncollared end before coupling-up occurs. Then by reason of the fixedness or permanency of collar $a$ I can get a perfectly rigid connection of the joint or pipe with the members D and E whether one end or the other of the pipe is above. This is illustrated in Figs. 1 and 2, and there is no possible blowing out of the upper connection, although there is no collar engagement therein, because by means of the integral collar $a$ below a pipe connection is made through coupling-nut C, which is so rigid that it is practically the same as if the pipe E extended in unbroken lengths directly into member D. Hence the coupling with D through nut B is as secure against blowing out as if the collar $a$ were there, as it is in Fig. 1. Of course it is possible to have a fixed or integral collar of this kind on one end of the pipe, because the coupling-nuts B and C can both be sleeved over the other end of the pipe, and this would not be possible if there were a head on this end of the pipe. In any event, however, whichever end is used above or below a suitably-tapered gasket is used for the upper connection as well as for the lower one; but a slight difference in the shapes of the said gaskets $c$ and $d$ is shown, and they may be of rubber, leather, soft metal, or other suitable material. The washer $c'$ is used with the nut which for the time engages the uncollared end of the pipe-joint.

From the foregoing description, as well as from the drawings, it will be seen that the coupling-pipe is essentially a pipe or section of a pipe, being of the same cross-section at both ends and throughout its length and distinguished from an ordinary piece of pipe by having a fixed collar at or near one end. This is the feature which makes it practical for coupling purposes, as herein described, and its belongings are the two gaskets $c$ and $d$ and washer $c'$ when used. The gasket $d$ is placed upon the collar end of the pipe and remains there whether this end be above or below, and gasket $c$ belongs permanently on the other end; but both ends of the pipe are alike perfectly smooth and without thread or corrugation or any roughening of any kind, and as these pipes are used for open plumbing they are nickle-plated and finished alike from end to end.

Obviously if the coupling were connected up at the top, as it is in Fig. 1, it could have a soldered connection at the other end with a pipe adapted to receive such connection, and this is possible because of the pipe from the coupling at said lower end.

What I claim is—

1. As a new article of manufacture, an elbow-shaped coupling-joint of the same cross-section from end to end and having one arm longer than the other and a fixed collar about its shorter arm and a smooth surface on the end of the longer arm, whereby a slip-joint may be made with said longer arm of greater or less penetration while the shorter arm is fixed in its connections by said collar.

2. A coupling-joint of the same cross-section from end to end and provided with a fixed collar about one end thereof, the external surface of said joint being smooth at both ends, in combination with coupling connections having externally-threaded members at each end into which the ends of said joint extend and coupling-nuts over said members, one of said nuts engaged over said collar and definitely locking the joint and the other nut out of engagement with said joint, whereby said joint is left free at its longer end to make slip connections of varying lengths, substantially as described.

3. In couplings for water-pipes and the like, a coupling-joint of elbow pattern of the same cross-section at both ends and having one arm longer than the other, and the shorter arm having a fixed collar about the same, the external surface of the joint being smooth at both ends, in combination with a pair of connections into which said arms project and the longer of said arms is free to slide to greater or less depth, substantially as described.

4. In couplings for water and other pipes, a coupling-joint of elbow shape and of the same cross-section at both ends, one arm of the joint being longer than the other and the shorter arm having a fixed collar, in combination with coupling connections for both ends of said joint, one of said connections having a fixed internally-tapered seat and the other a square seat, and the said joint interchangeable end for end in said connections, whereby connections of varying lengths at either end of the coupling can be made, substantially as described.

In testimony whereof I sign this specification in the presence of two witnesses.

JOSEPH H. GLAUBER.

Witnesses:
H. T. FISHER,
C. A. SELL.